Nov. 8, 1966 R. A. BAKER ETAL 3,284,671

ELECTRONIC ASSEMBLY WITH DIP-SOLDERED LEADS

Filed Oct. 9, 1964 3 Sheets-Sheet 1

INVENTORS.
RONALD A. BAKER
DAVID J. PROPPS

BY [signature]

ATTORNEY

Nov. 8, 1966 R. A. BAKER ETAL 3,284,671

ELECTRONIC ASSEMBLY WITH DIP-SOLDERED LEADS

Filed Oct. 9, 1964 3 Sheets-Sheet 2

INVENTORS.
RONALD A. BAKER
DAVID J. PROPPS
BY Robert Levine
ATTORNEY

ELECTRONIC ASSEMBLY WITH DIP-SOLDERED LEADS

Filed Oct. 9, 1964 3 Sheets-Sheet 3

INVENTORS.
RONALD A. BAKER
DAVID J. PROPPS
BY Robert Levine
ATTORNEY

United States Patent Office 3,284,671
Patented Nov. 8, 1966

3,284,671

ELECTRONIC ASSEMBLY WITH DIP-SOLDERED LEADS

Ronald A. Baker, Mexico City, Mexico, and David J. Propps, Indianapolis, Ind., assignors to P. R. Mallory & Co., Inc., Indianapolis, Ind., a corporation of Delaware Filed Oct. 9, 1964, Ser. No. 402,810
6 Claims. (Cl. 317—101)

The present invention relates to electronic assemblies and more particularly relates to making and packaging electronic assemblies wherein the electronic components are resistors, capacitors and rectifiers and the like of the type comprising a body portion having a wire lead extending axially from opposite ends thereof.

The generally accepted method for joining axial lead components into a multiple structure is to either solder or weld the terminal leads to another circular conductor lead. However, this method has a number of disadvantages. Some form of remote fixture must be used to line up the components with their interconnecting conducting wires, in preparation for soldering or welding to insure that the external parameters of the manufactured system is of uniform form factor so that this may then be loaded into its container. This process demands both loading and unloading the components and conducting leads from the remote fixture, which is a time consuming, high labor operation. Another disadvantage is that many soldered or welded joints are required. The aforementioned joints are normally of a cross wire nature which results in minimum electrical contact and mechanical strength area. Furthermore, when the welded or soldered structure is placed into its container, some malformation is normally experienced due to operator handling. An effort to place the malformed sub-assembly into its container often strains the soldered or welded joints and results in intermittent or open circuit conditions. Further, the axial leads are often subjected to sufficient stress that the internal connections within each component are damaged. Another disadvantage resides in the necessity of individually making each connection between the component and its conductor wire system, which is a time consuming process.

It is therefore an object of the present invention to provide a method of assembling axial lead components into a multiple structure which overcomes the disadvantages of prior art.

It is an object of the present invention to provide a ladder conductor system for assembling axial lead components which serves as a loading fixture and which is a component of the system.

It is an object of the present invention to provide a ladder conductor system wherein the axial lead components are loaded into the ladder conductor component, the terminal wires are twisted lead ladder conductor sub-assembly may be dip soldered thus providing maximum soldered surface area to insure good electrical and mechanical connection.

The present invention in another of its aspects, relates to the novel features of the instrumentalities of the present invention described therein for teaching the principal object of the present invention and to the novel principles employed in the instrumentalities whether or not these features and principles may be used in the said object or in the said field.

With the aforementioned objects enumerated, other objects will be apparent to those possessing ordinary skill in the art. Other objects will appear in the following description, appended claims and appended drawings. The invention resides in the novel construction, combination, arrangement, and cooperation of elements as hereinafter described and more particularly as defined in the appended claims.

For a fuller understanding of the nature and objects of the invention, reference has been made to the following detailed description, taken in connection with the accompanying drawings in which.

Generally speaking, the present invention comprises a ladder-conductor component for electronic assemblies wherein axial lead components are positioned into the ladder-conductor component, the lead wires twisted into place and the resulting axial twisted lead ladder conductor sub-assembly is dip-soldered to insure good electrical and mechanical connections. The bridge between the sides of the ladder conductor component is cut away and the sub-assembly dropped into its container.

Figure 1:
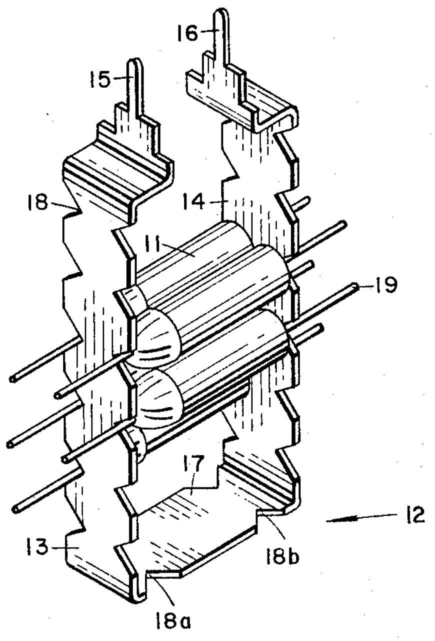
FIGURE 1 is a view in perspective of the electronic components positioned in the ladder-conductor component.

In FIGURE 1, axial lead components 11 are loaded into the ladder conductor components 12. Ladder conductor component 12 has two sides 13 and 14, sides 13 and 14 having terminals 15 and 16 respectively. Sides 13 and 14 are bridged by section 17 for each of handling during the loading of axial lead components 11. Sides 13 and 14 have slots 18 therein for positioning of components 11. Slots 18 are herein depicted as V-shaped but are not limited to such.

Figure 2:
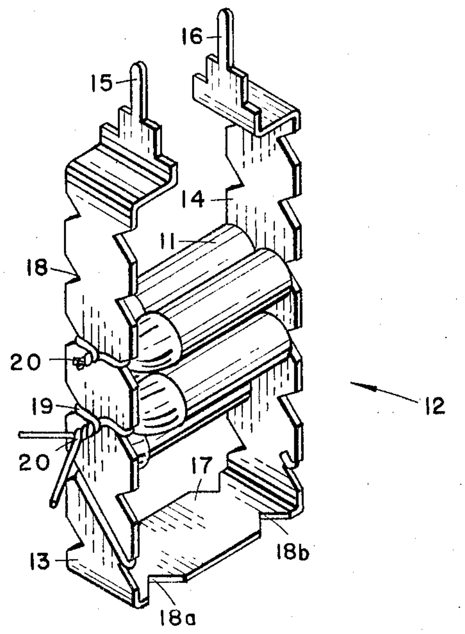
FIGURE 2 is a view in perspective of the electronic components positioned in the ladder-conductor component after the leads have been twisted in place.
Figure 3:
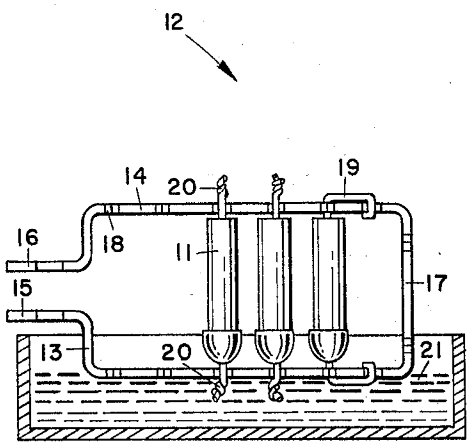
FIGURE 3 is a pictorial view of the ladder sub-assembly being dip-soldered.

After components 11 have been positioned in the ladder conductor component 12, the leads 19 are twisted and clipped as shown in FIGURE 2 forming connections 20. The connections 20 are secured by dip-soldering sides 13 and 14 of ladder conductor component 12 in a solder bath 21. This provides maximum soldered surface area to insure good electrical and mechanical connections and large surface area electrical connections which is considered to be good practice within electronic assemblies. The resulting structure is of very rigid form factor and accurate size, thus it is not necessary to adjust the ladder component sub-assembly when it is loaded into its container.

Figure 4:
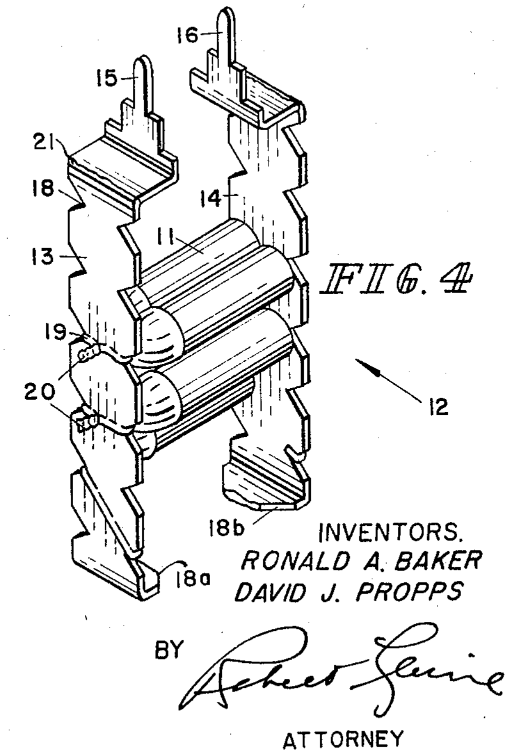
FIGURE 4 is a view in perspective of the ladder sub-assembly after the leads have been dip-soldered and the bridge between the sides of the ladder sub-assembly has been removed.

After the dip-soldering stage, portion 17 of ladder conductor component 12 is cut away so as to isolate side 13 from side 14 as shown in FIGURE 4. For ease of operation, the cropping is done at a set of slots. After sides 13 and 14 have been isolated, the ladder conductor sub-assembly 12 is ready to be loaded into its container.

Figure 5:
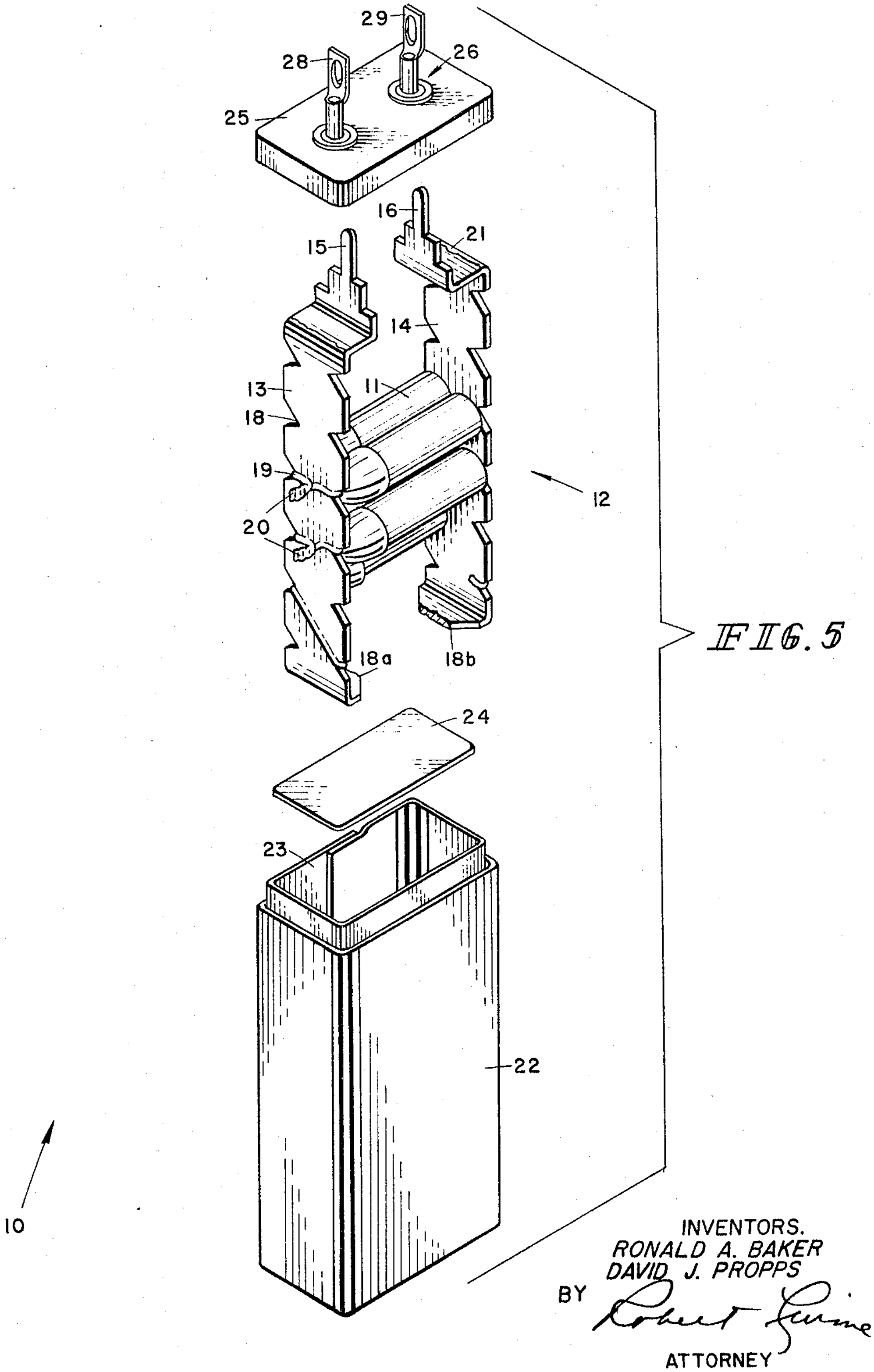
FIGURE 5 is an exploded view of the ladder-assembly fixture for axial lead components.

FIGURE 5 is an exploded view of the assembly showing the interrelation of ladder conductor sub-assembly 12 with container 22. Normally with this sort of package an insulating sleeve 23 is placed around the inner wall of container 22 with an insulating plate or disk 24 at the bottom of the container prior to filling the empty container with some form of potting material such as epoxy pitch and the like. It is also possible with the ladder conductor system described to wrap the outside of the ladder conductor sub-assembly with a heat sealing insulating material and heat seal the ends together prior to dropping the ladder conductor sub-assembly 12 into container 22. Ladder conductor sub-assembly 12 as hereinbefore described is placed into container 22. Container lid 25 having glass-to-metal hermetic seal 26 is placed in juxtaposition to terminals 15 and 16 of ladder conductor sub-assembly 12. A better method in assembling this system is to fit terminals 15 and 16 of ladder conductor sub-assembly 12 through the seal structure 26 in the container top assembly 25, solder or weld as required and then drop the structure into its container.

Figure 6:
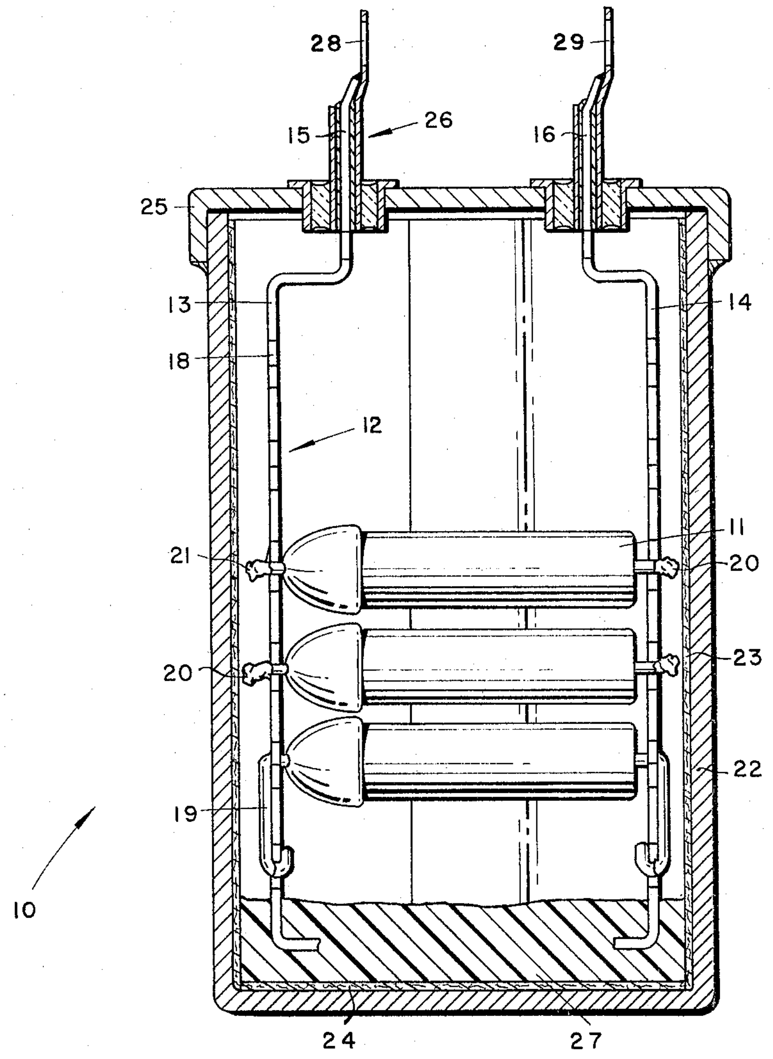
FIGURE 6 is a cut away view of the assembly showing the interrelation of parts therein.

FIGURE 6 is a cut-away view of the complete assembly. Ladder conductor component 12 which contains the axial lead components 11 is positioned into container 22 and secured therein by a potting material 27. Ladder conductor sub-assembly 12 is insulated from container 22 by a side wall insulator 23 and bottom insulator 24. It can be seen that the axial lead components 11 are positioned in ladder conductor component 12 by means of slots 18 and the leads 19 twisted and dip-soldered to form connections 20. Terminals 15 and 16 of ladder conductor sub-assembly 12 are positioned in the terminal leads 28 and 29 and soldered or welded into place. Container lid 25 has two hermetic glass-to-metal seals 26. However, the hermetic seal is optional depending upon the application of the completed assembly.

As can be seen by the drawings, the ladder conductor component 12 is so constructed so that a plurality of axial lead components such as capacitors, rectifiers, resistors and the like may be positioned and secured therein. The ladder conductor component as shown is illustrative and not meant in a limiting sense. It can be made to accommodate as few or as many units as are necessary and can further be adapated so that units of varying sizes may be connected in parallel therein.

Since many widely different embodiments of the invention may be made without departing from the scope thereof, it is intended that all matter contained in the above description and shown in the accompanying drawings shall be interposed as illustrative and not in a limiting sense.

Having thus described our invention, we claim:

1. Holding means for a plurality of axial lead electronic components comprising: a pair of parallel electrically conductive frames, electrical terminals formed on a first extremity of said frames, a plurality of spaced notches aligned in opposite longitudinal sides of each of said frames, said notches in one of said frames aligned with said notches of the other of said frames, said frames predeterminately spaced to retain axial lead electronic components therebetween, said leads of said components projecting through said notches, each of said leads coupled to said notch through which said lead projects, and means encapsulating said frames and said electrical components.

2. Holding means for a plurality of axial lead electronic components comprising: a pair of parallel electrically conductive frames, electrical terminals formed on a first extremity of said frames, a plurality of spaced notches aligned in opposite longitudinal sides of each of said frames, said notches in one of said frames aligned with said notches of the other of said frames, said frames predeterminately spaced to retain axial lead electronic components therebetween, said leads of said components projecting through said notches, each of said leads coupled to said notch through which said lead projects, and means encapsulating and hermetically sealing said frames and said electrical components.

3. A ladder conductor component for axial lead electronic component assemblies comprising: a pair of parallel electrically conductive frames, electrical terminals formed on a first extremity of said frames, a plurality of spaced notches aligned in opposite longitudinal sides of each of said frames, said notches in one of said frames aligned with said notches of the other of said frames, said frames predeterminately spaced to retain axial lead electronic components therebetween, said leads of said components projecting through said notches, each of said leads coupled to said notch through which said lead projects and coupled to an adjacent lead, and means encapsulating said frames and said electrical components.

4. A ladder conductor component for axial lead electronic component assemblies comprising: a pair of parallel electrically conductive frames, electrical terminals formed on a first extremity of said frames, a plurality of spaced notches aligned in opposite longitudinal sides of each of said frames, said notches in one of said frames aligned with said notches of the other of said frames, said frames predeterminately spaced to retain axial lead electronic components therebetween, said leads of said components projecting through said notches, each of said leads soldered to said notch through which said lead projects and wrapped about and soldered to an adjacent lead, and means encapsulating said frames and said electrical components.

5. An electronic assembly comprising: a pair of predeterminately spaced parallel electrically conductive frames having electrical terminals formed at an extremity of said frames and a plurality of spaced notches formed in the side thereof, said notches of one of said frames being aligned with said notches of the other of said frames; a plurality of components having axial leads disposed between said frames so as to have said leads held by said notches, each of said leads being wrapped about and soldered to an adjacent lead and soldered to said notches; a first container for enclosing said assembly, said container being disposed about said frames and said components; an insulating inner container for separating said frame and said components from said first container; and a top cover for sealing said first container, said top cover having hermetically sealed feedthrough means for interfitting with said electrical terminals formed on said frame.

6. An electronic assembly comprising: a ladder conductor subassembly comprising a pair of predeterminately spaced parallel electrically conductive frames having electrical terminals formed at an extremity thereof and a plurality of spaced notches formed in opposite longitudinal sides thereof, said notches in one of said frames being transversely aligned with said notches in the other said frames; a plurality of axial lead components positioned between said frames so that one axial lead of each of said components interfits with one of said notches in one of said frames and the other axial lead interfits with a corresponding notch in the other of said frames, said leads being wrapped about and soldered to an adjacent lead and soldered to said notches; and an encapsulating means for said electronic assembly.

References Cited by the Examiner

UNITED STATES PATENTS

| | | | |
|---|---|---|---|
| 2,596,237 | 5/1952 | Gross et al. | |
| 2,862,992 | 12/1958 | Franz | 317—101 X |
| 2,986,675 | 5/1961 | Burson et al. | |
| 3,215,898 | 11/1965 | Perret et al. | |

FOREIGN PATENTS

| | | |
|---|---|---|
| 664,024 | 1/1952 | Great Britain. |

ROBERT K. SCHAEFER, *Primary Examiner.*

ROBERT S. MACON, *Examiner.*

W. C. GARVERT, *Assistant Examiner.*